US007299825B2

(12) United States Patent
Milburn

(10) Patent No.: US 7,299,825 B2
(45) Date of Patent: Nov. 27, 2007

(54) GAS-PANEL ASSEMBLY

(75) Inventor: Matthew L. Milburn, Felton, CA (US)

(73) Assignee: Ultra Clean Holdings, Inc., Menlo Park, CA (US)

( * ) Notice: Subject to any disclaimer, the term of this patent is extended or adjusted under 35 U.S.C. 154(b) by 320 days.

(21) Appl. No.: 11/219,101

(22) Filed: Sep. 1, 2005

(65) Prior Publication Data

US 2006/0272720 A1 Dec. 7, 2006

Related U.S. Application Data

(60) Provisional application No. 60/687,018, filed on Jun. 2, 2005.

(51) Int. Cl.
*F16K 11/10* (2006.01)

(52) U.S. Cl. .................................................... 137/884

(58) Field of Classification Search ................ 137/269, 137/270, 271, 597, 884

See application file for complete search history.

(56) References Cited

U.S. PATENT DOCUMENTS 4,008,736 A 2/1977 Wittmann-Liebold et al.
4,807,660 A 2/1989 Aslonion
5,361,805 A 11/1994 Moyeux
5,368,062 A 11/1994 Okumura et al.
5,488,915 A 2/1996 McNeill
5,488,925 A 2/1996 Kumada
5,529,088 A 6/1996 Asou
5,605,179 A 2/1997 Strong et al.
5,713,582 A 2/1998 Swensen et al.
5,730,448 A 3/1998 Swensen et al.
5,735,532 A 4/1998 Nolan et al.
5,735,533 A 4/1998 Nolan et al.
5,836,355 A 11/1998 Markulec et al.
5,860,676 A 1/1999 Brzezicki et al.

(Continued)

FOREIGN PATENT DOCUMENTS

DE 26 30 050 A1 1/1978

(Continued)

OTHER PUBLICATIONS

Uchisawa, O. et al., "Compact Gas Control System", 18th Workshop on ULSI Ultra Clean Technology, Physics and Chemistry of Specialty Gases for Advanced Semiconductor Processings, pp. 15-24, 1992.

*Primary Examiner*—John Fox
(74) *Attorney, Agent, or Firm*—Peter J. Dehlinger; Perkins Coie LLP

(57) ABSTRACT

A gas-panel manifold for use in a gas-panel assembly mounted on a support is disclosed. The manifold includes (i) a plurality of two-port stations at which gas components, including one or more gas-valve components, can be mounted, (II) at least one station having a port for accommodating an overhead fluid connection, and (iii) internal fluid connections between individual stations in the manifold, for carrying a gas from one gas component mounted on the assembly to another, and for carrying gas from said one station to one of the two ports at a station which a valved gas component is to be mounted. The fluid connections have a cross-sectional area that is larger than can be accommodated by a three-port station of the type used for mounting a three-port valved gas component.

19 Claims, 12 Drawing Sheets

U.S. PATENT DOCUMENTS

| | | | |
|---|---|---|---|
| 5,992,463 | A | 11/1999 | Redemann et al. |
| 6,039,360 | A | 3/2000 | Ohmi et al. |
| 6,085,783 | A | 7/2000 | Hollingshead |
| 6,123,340 | A | 9/2000 | Sprafka et al. |
| 6,142,539 | A | 11/2000 | Redemann et al. |
| 6,189,570 | B1 | 2/2001 | Redemann et al. |
| 6,192,938 | B1 | 2/2001 | Redemann et al. |
| 6,283,155 | B1 | 9/2001 | Vu |
| 6,394,138 | B1 | 5/2002 | Vu et al. |
| 6,435,215 | B1 | 8/2002 | Redemann et al. |
| 6,474,700 | B2 | 11/2002 | Redemann et al. |
| 6,502,601 | B2 | 1/2003 | Eidsmore et al. |
| 6,546,961 | B2 | 4/2003 | Fukushima |
| 6,615,871 | B2 | 9/2003 | Ohmi et al. |
| 6,629,546 | B2 | 10/2003 | Eidsmore et al. |
| 6,640,835 | B1 | 11/2003 | Rohrberg et al. |
| 6,644,353 | B1 | 11/2003 | Eidsmore |
| 6,776,193 | B2 | 8/2004 | Eidsmore |
| 7,048,008 | B2 * | 5/2006 | Milburn ...................... 137/884 |
| 2002/0000256 | A1 | 1/2002 | Eldsmore et al. |
| 2004/0112446 | A1 | 6/2004 | Eldsmore et al. |
| 2005/0056330 | A2 | 3/2005 | Eldsmore et al. |

FOREIGN PATENT DOCUMENTS

| | | |
|---|---|---|
| EP | 0 637 712 B1 | 2/1995 |
| EP | 0 754 896 B1 | 1/1997 |
| EP | 0 715 112 A2 | 5/1997 |
| EP | 0 816 731 B1 | 1/1998 |
| EP | 0 837 278 A1 | 4/1998 |
| EP | 0 844 424 B1 | 5/1998 |
| EP | 0 845 623 B1 | 6/1998 |
| EP | 0 859 155 B1 | 8/1998 |
| EP | 0 905 383 A1 | 3/1999 |
| EP | 0 908 929 B1 | 4/1999 |
| EP | 1 239 203 A1 | 9/2002 |
| WO | WO99/45302 | 9/1999 |

* cited by examiner (Unmodified Assembly)

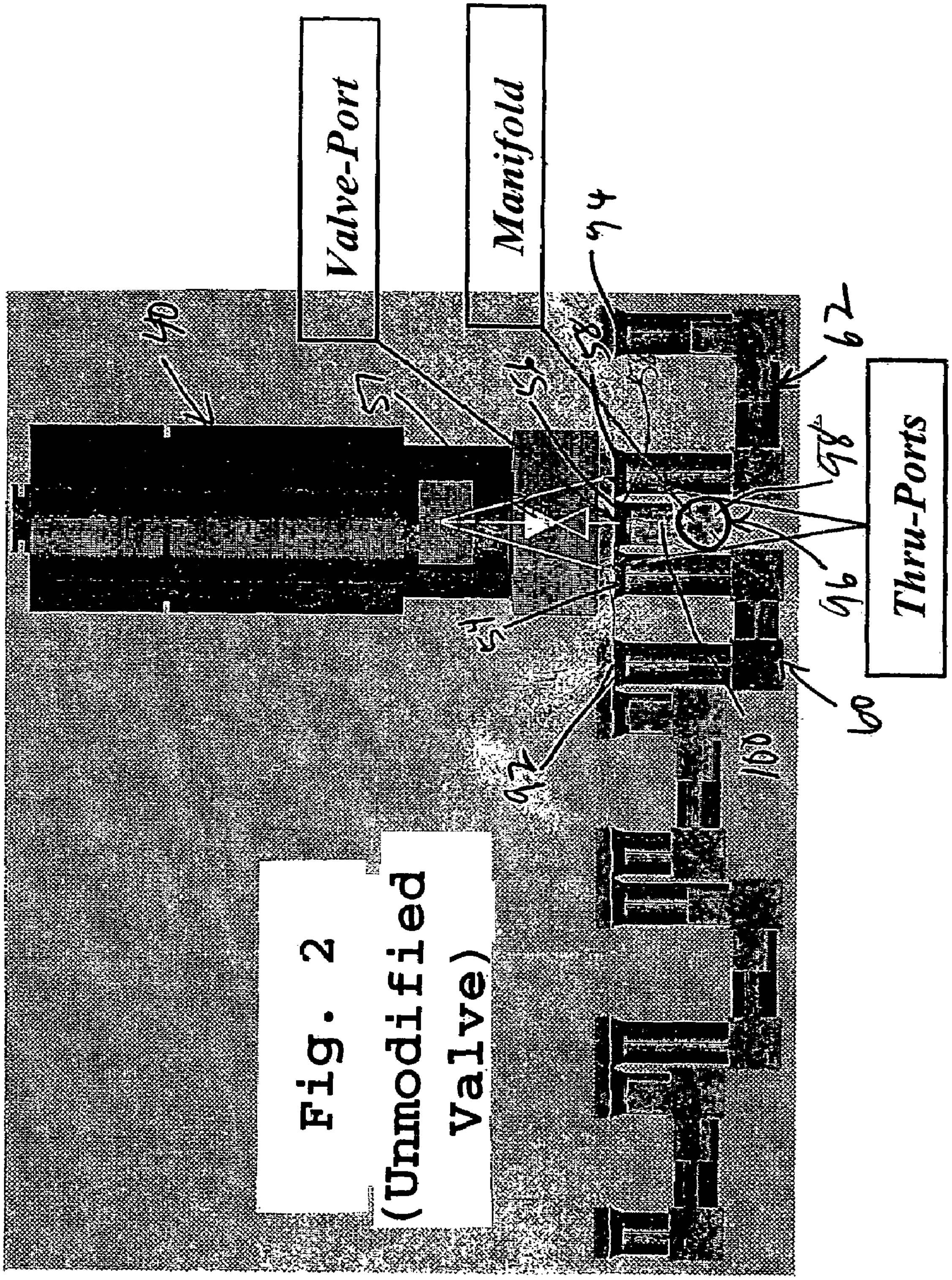
Fig. 2 (Unmodified Valve)

GAS-PANEL ASSEMBLY

This patent application claims priority to U.S. provisional patent application Ser. No. 60/687,018 filed on Jun. 2, 2005, which is incorporated herein in its entirety by reference.

FIELD OF THE INVENTION

The present invention relates to a gas-panel assembly, and in particular, to a modification of such an assembly that allows larger-diameter fluid connections than are possible in existing gas-panel manifolds.

BACKGROUND OF THE INVENTION

The manufacture of semiconductors involves using gases of very high purity, such as oxygen, as well as highly corrosive materials. These gases are controlled by fluid manifolds made up of valves, regulators, pressure transducers, mass flow controllers and other components that must maintain the purity of the gas, and also maintain resistance to the corrosive effects of the fluids. Currently, gas panels are used for mixing, pre-mixing, purging, sampling and venting the gases. Typically, the gas panel is used to provide a gas or a mixture of gases into a reaction chamber. These gas panels have historically been made up of hundreds of discreet or individual components, such as valves, filters, flow regulators, pressure regulators, pressure transducers, and connections. The fluid manifolds are designed to provide desired functions, such as mixing and purging, by uniquely configuring the various discreet components.

Modular manifold systems have been introduced into the industry in order to overcome these problems. A gas panel comprising a plurality of modular blocks with passages routed in the blocks is described by Markulec et al. (U.S. Pat. No. 5,836,355). Modular substrate blocks which have both directional and transverse flow direction capabilities united in a single modular substrate block are described by Hollingshead (U.S. Pat. No. 6,085,783). These modular systems were typically fashioned with the entire modular block made of high purity metal required for manufacture of semiconductors. Accordingly, these block components had high manufacturing costs due to the cost of the material and the complexity of machining multiple passageways of a single block.

A modular block using different materials for the fluid passageway and the block is described in Eidsmore et al. (U.S. Pat. No. 6,629,546). In this system, the manifold system includes one or more bridge fittings that are mounted within a channel of a backing plate for structural support or in a support block. Thus, the bridge fittings are supported from beneath. Ohmi et al. (U.S. Pat. No. 6,039,360) describes a gas panel having a holding member with a U-shaped cross-section and a channel member held by the holding member. A disadvantage of these systems is that the configuration of the system cannot be modified without taking the system apart.

More recently, a gas panel assembly having separate block and pipe modular components was disclosed in co-owned U.S. patent application "Gas-Panel Assembly," Ser. No. 11/105,730, filed Apr. 13, 2005. The modular gas panel assembly disclosed permits easy replacement and/or addition or removal of gas components within individual sticks, and removal of pipe modules within a stick for cleaning, replacement or reconfiguring. However, reconfiguring the assembly to add or remove sticks, or to clean or replace pipe connections between adjacent sticks, still requires removal of several gas components and modular blocks in each stick. It would thus be desirable to further modify the modular system, and more generally, any gas panel system, to allow sticks to be added or removed from the assembly, or the pipe modules connecting adjacent sticks to be replaced and/or reconfigured with minimal disturbance of the components already in place. It would also be desirable to modify a gas panel system to simply gas-purging operations that are required periodically to clean the assembly or prepare it for use with different gas components. It would be further desirable to provide a modular gas panel having enlarged-diameter fluid connections capable of handling large gas volumes, but without necessitating and increase the scale of the gas panel or its components.

SUMMARY OF THE INVENTION

In one aspect, the invention includes a gas-panel manifold for use in a gas-panel assembly mounted on a support. The manifold includes (i) a plurality of two-port stations at which gas components, including one or more gas-valve components, can be mounted, (II) at least one station having a port for accommodating an overhead fluid connection, and (iii) internal fluid connections between individual stations in the manifold, for carrying a gas from one gas component mounted on the assembly to another, and for carrying gas from the one station to one of the two ports at a station which a valved gas component is to be mounted. The connections in the manifold have a cross-sectional area that is larger than can be accommodated by a three-port station of the type used for mounting a three-port valved gas component.

The cross-sectional area of the fluid connections may be at least about twice that of a fluid connection that can be accommodated by such a three-port connection. For example, where component stations are dimensioned to accommodate gas components with 1 and ⅛ inch block size, the fluid connections may have internal diameters between 0.305 to 0.375 inches.

The one manifold station of element (II) may have two ports, each for accommodating an overhead fluid connection to that station.

The manifold may be composed of a plurality of side-by-side modular blocks, and the internal fluid connections may be formed by a plurality of pipe modules supported by the blocks. Each block module may be composed of a pair of confronting block modules, where each block module provides: (i) at least one groove formed therein, such that when two block modules are placed together, confronting grooves in the two modules form an opening in which a portion of an internal pipe module can be received, and (II) an upper surface region adjacent each groove, such when two block modules are placed together, confronting surface regions define a support region for supporting a collar of a pipe module having a connector received in the opening. The pipe modules, but not the block modules, may be formed of a corrosion-resistant material, such as 304 stainless steel, 316L VIM-VAR, Hastelloy™, aluminum, or ceramic. The block modules may be formed of stainless steel and aluminum.

In another aspect, the invention is directed to an improvement in a gas-panel assembly of the type having a manifold with a plurality of gas-component stations at which gas components can be mounted, including stations having both two ports and three ports, and internal fluid connections between the individual ports in the stations. The improvement comprises: (i) the replacement of each three-port manifold station by a two-port station, (II) the addition of an external-connection manifold station adjacent each manifold station at which a three-port station is replaced by a two-port station, and (iii) a modification of the fluid connections to increase their cross-sectional area or areas to a size allowed at a two-port station, but not a three-port station. The external-connection station provides an internal fluid connection between an external gas tube and one of the ports in the adjacent two-port station. The improvement contemplates various modifications as disclosed above.

In still another aspect, the invention includes a method for increasing the gas-flow capacity in a gas-panel assembly of the type composed of a manifold having a plurality of gas-component stations at which a plurality of gas components are mounted, including stations having both two ports and three ports, and internal fluid connections between the individual ports in said stations. The method includes the steps of: (i) replacing each three-port manifold station in the assembly to a two-port station, (II) adding an external-connection manifold station adjacent each manifold station at which a three-port station is replaced by a two-port station, and (iii) modifying the fluid connections to increase their cross-sectional area or areas to a size allowed at a two-port station, but not a three-port station. The external-connection station provides an internal fluid connection between an external gas tube and one of the ports in the adjacent two-port station.

These and other objects and features of the invention will be more fully understood when the following detailed description of the invention is read in conjunction with the accompanying drawings.

BRIEF DESCRIPTION OF THE DRAWINGS

FIG. 2 shows a three-port valve manifold connection in the unmodified assembly of FIGS. 1;

DETAILED DESCRIPTION OF THE INVENTION

I. Definitions

The terms below have the following meanings unless indicated otherwise.

The terms "fluid manifold" and "gas panel" are used interchangeably, and refer to a system of elements, some including pathways, and fluid components to regulate, transport and/or control a fluid, liquid, and/or vapor.

The term "fluid" as used herein refers liquids, gases, and/or vapors.

An element is in "fluid communication" with another element when a fluid is able to travel from one element to the other via capillary action and/or gravity. The elements do not need to be in direct contact; i.e., other elements through which the fluid can pass may be intervening.

II. Modular Components for Linking Adjacent Gas-Panel Sticks

The invention includes modular components designed to provide external; (above-surface) fluid connections between adjacent sticks in a gas-panel assembly, and a modified gas-assembly having such external fluid connections. As will be seen, the modular units offer a number of advantages in a gas assembly, including ease of replacing, adding or removing entire sticks in the assembly, reduced materials cost, and simpler gas-purge valving.

The gas-panel assembly which is to be modified by the modular components of the invention includes, conventionally, two or more gas-panel manifolds mounted on a support, and having a plurality of gas components carried on a surface of each manifold, and subsurface or internal fluid connections between individual components carried on each manifold. A gas-panel manifold with attached gas components is also referred to herein as a stick.

The modular components in the invention include one or more modular blocks adapted to be removably placed adjacent an end of or within each stick, where each modular block provides at least one support region. Either by way of a separate internal pipe modules, or by fluid passageways formed in the modular blocks, the modular blocks provide, in each manifold, means defining an internal fluid passageway between a selected gas component carried on the manifold and the support region in an adjacent modular block unit, forming a surface port in the modular block. The modular blocks also include, for each manifold, one or more external pipe modules adapted to provide an external fluid passageway between surface ports formed in the modular blocks associated with adjacent manifolds in the gas assembly.

A gas panel made up of separate block and pipe modules, and the modifications thereof in accordance with the invention, will be described in Section IIA. This embodiment of the invention provides, in particular, advantages in terms of flexible stick and assembly construction and material cost savings. A gas panel made up of modular blocks with fluid passageways formed therein, and the modifications thereof in accordance with the invention, will be described in Section IIB.

IIA. Modular Units with Separate Block and Pipe Modules

Figure 1A:
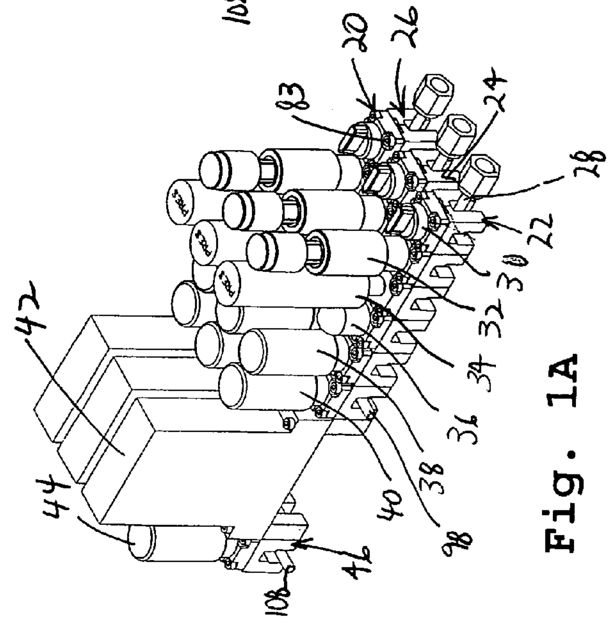
FIGS. 1A-1D are perspective views illustrating a basic, unmodified gas-component assembly with three assembly sticks, shown with gas components (1A); with gas components removed (1B); with block modules removed (1C); and an enlarged view taken along the region 1D in FIG. 1C.
Figure 1B:
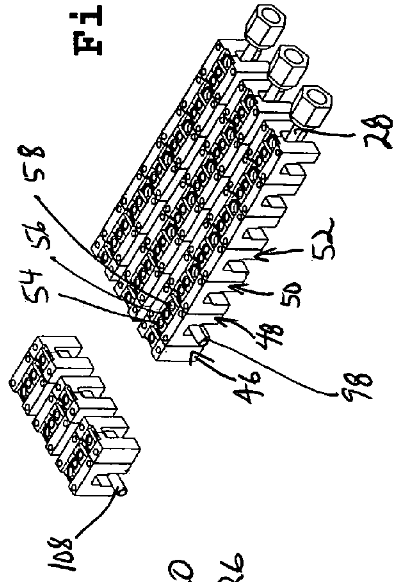
Figure 1D:
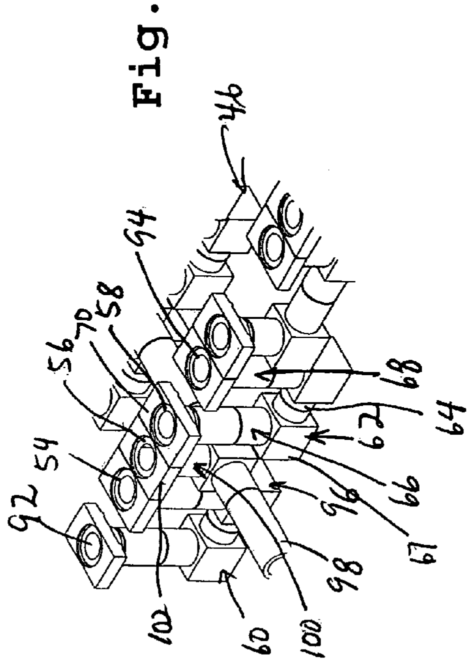
Figure 1C:
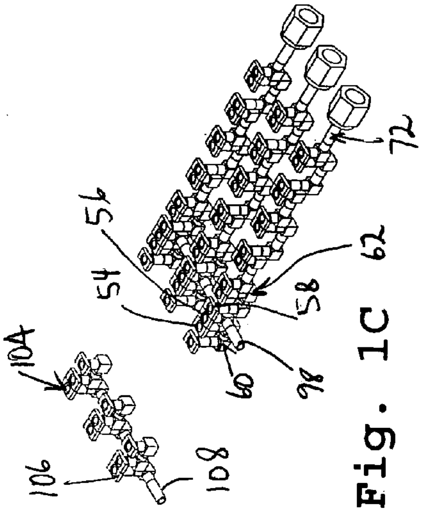

FIG. 1A shows a gas-panel assembly 20 composed of three gas-panel sticks, indicated generally at 22, 24, and 26. The assembly shown here and in accompanying FIGS. 1B-1D is unmodified by the modular components of the present invention, and therefore represents a basic, unmodified assembly. The particularly assembly shown is detailed in the above cited Ser. No. 11/105,730 U.S. patent application, which is incorporated herein by reference in its entirety. The basic features of the unmodified assembly will be described below to the extent useful for understanding the modification made in accordance with the present advantages, and the advantages of the modification in terms of ease of gas-component and stick interchangeability.

Although not shown in FIG. 1A, the three sticks forming the assembly are mounted on a support or substrate, typically a table or other elevated support. The purpose of the gas assembly is to control the flow of one or more fluids, typically gases, and ultimately to output the gases as pure gases or mixtures of gases to be supplied to a workpiece, e.g., silicon wafer in a semi-conductor fabrication operation. The gases are supplied at gas inlets, such as inlet 28 in stick 22, at the upstream end of the assembly, and flow through a number of gas components in each stick before being released and mixed at a controlled pressure and flow rate at the downstream end of the assembly.

Stick 22, which is representative, includes in an upstream-to-downstream direction, gas inlet 28, a manual valve 30, a regulator 32, a pressure transducer 34, a filter 36, a two-port valve 38, a purge-gas valve 40, a mass-flow controller (MFC) 42, and a two-port valve 44. Each of these components is connected to its downstream neighboring component by fluid passageways that, in the present gas assembly, are provided by separate pipe modules, as will be described below with reference to FIGS. 1C and 1D. Thus, a selected gas supplied to a manifold through the upstream gas inlet flows through each of the just-described components where the gas is regulated and filtered and ultimately carried, either by itself or more commonly, mixed with other gases from the other assembly sticks, to a workstation at which the gas is employed, e.g., for deposition, etching or cleaning in a micro-fabrication process. The gas components in each stick are mounted on a manifold, such as manifold 46 in stick 22. That is, a stick is composed of the fluid manifold and the gas components mounted thereon.

FIG. 1B shows the three manifolds, such as manifold 46, in assembly 20. As seen, each manifold, such as manifold 46, is made up of a plurality of modular blocks, such as blocks 48, 50, 52, where each block, such as block 48, provides two or more ports on the manifold's upper surface, such as ports 54, 56, 58 (FIGS. 1B-1D). In each block, an upstream port, such as port 58 in block 48, is connected to a port in the immediately adjacent upstream block, e.g., block 50, and a downstream port, e.g., port 54 in block 48, is connected to a port in the immediately adjacent downstream block. Each block supports a gas component mounted on the block, and provides a fluid connection, through that gas component, between immediately adjacent upstream and downstream gas components in a stick.

The ports in the modular blocks are provided by pipe modules, such as pipe modules 60, 62 forming ports 54, 58, respectively, in modular block 48 (FIGS. 1B-1D). The construction of the pipe modules in assembly 20, which is detailed in the above-cited, co-owned U.S. patent application, applies as well to the pipe modules forming the modular units of the present invention, as well be appreciated below.

FIG. 1D shows an enlarged perspective view of several pipe modules, including modules 60, 62 in the arrangement they have in manifold 46. Module 62, which is representative, includes a horizontally extending main section 64 joined at its opposite ends to vertically extending connectors 66, 68. Each connector, in turn, is joined at its lower, distal end to the main section, such as section 66, through a pipe elbow, such as elbow 67, and terminates at its upper end in a flange or collar, such as collar 70. The upper open end of the connector at the collar forms a port, such as port 58. Thus, each pipe module forms a fluid-flow pathway defined by the main pipe section and two or more connectors. In the embodiment shown in FIGS. 1C and 1D, the connectors are joined to the elongate section through Microfit™ elbow fittings. It will be appreciated, however, that the elongate section may be joined to a connector by any suitable fitting or bend pipe section. For example, the elongate section may be welded or otherwise permanently joined to the connectors, as described above, or a weldless system may be used, especially for an ultra clean application. In yet another embodiment, all or part of the pipe module, including elongate member, connector sections, and flanges may be formed of a single piece, not shown.

The elongate pipe section and connector sections are typically joined to form a U-shape or W shape (three connectors); however, other shapes are possible. As seen in FIG. 1C, some of the pipe modules, such as upstream-end module 72 in assembly 48, may include one or more external connections that may serve as an inlet and/or outlet for connection of a fluid line or source, a waste or overflow receptacle, or the reaction chamber. The external connections may include any suitable fitting, such as a VCR™ connection, not shown, for connection to an external source, purge, receptacle, or waste.

For ultra-high purity embodiments, the interior surfaces of the pipe modules may be internally electropolished and/or finished according to known methods to prevent corrosion and to provide an ultra-clean environment. In a preferred embodiment, all wetted surfaces including the fluid-flow pathway and flanges are electropolished.

The pipe modules may be formed of any material suitable for the application. For ultra-high purity applications, the pipe modules may be formed of high-grade stainless steel such as 304SS and 316SS, nickel alloys, sintered alloys, ceramic, high grade aluminum, tungsten alloys, and titanium alloys. In a preferred embodiment, at least the wet surfaces (flow path and the flange) of the pipe modules are formed of a non-corrosive, corrosion resistant, or non-reactive metal or alloy. In a more preferred embodiment, the pipe modules are formed of 316L VIM-VAR or an alloy such as Hastelloy™ (available from Haynes International). For industrial uses, any suitable plastic or metal is suitable. It will be appreciated that each of the elongate section, connector sections and flanges may be formed of a different material. It will further be appreciated that the block modules may, but need not be, formed of the same material as the pipe modules. In fact, one important advantage of the invention is that the pipe modules, which are exposed to corrosive gases and other fluids, may be formed of high-quality, and typically more expensive metal or metal alloys, while the block modules, which are not exposed to corrosive fluids, may be formed of relatively inexpensive material, such as different grades of stainless steel, different grades of aluminum, ceramic, sintered metals, stamped metals, and forged metals. In a preferred embodiment, the block modules are formed of stainless steel or aluminum.

Figure 4A:
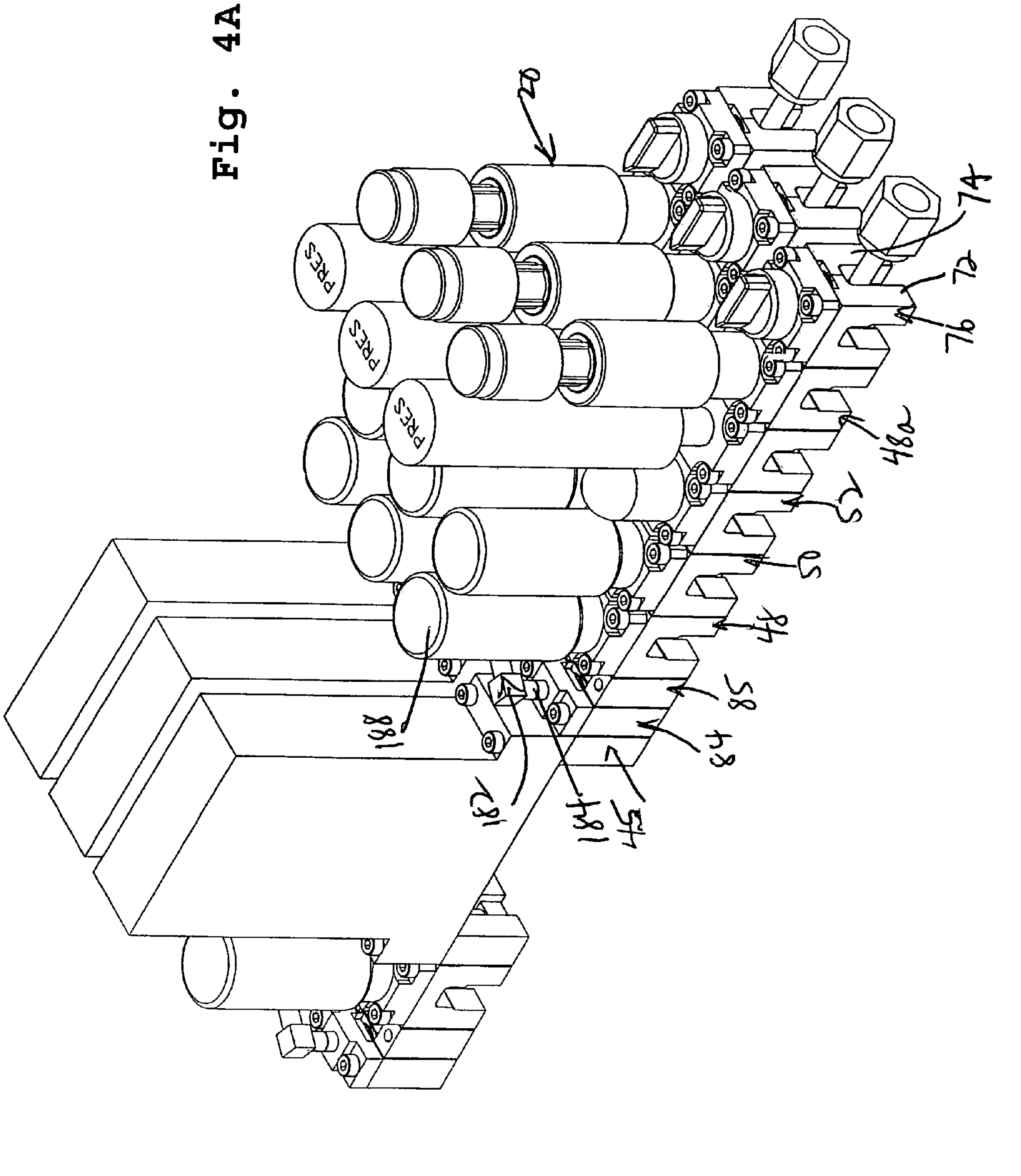
FIGS. 4A-4D are perspective views like those of FIGS. 1A-1D and respectively, but illustrating a gas-component assembly modified according to the present invention to include two-port, offset external pipe connections and a two-port valve purge-gas configuration.
Figure 4B:
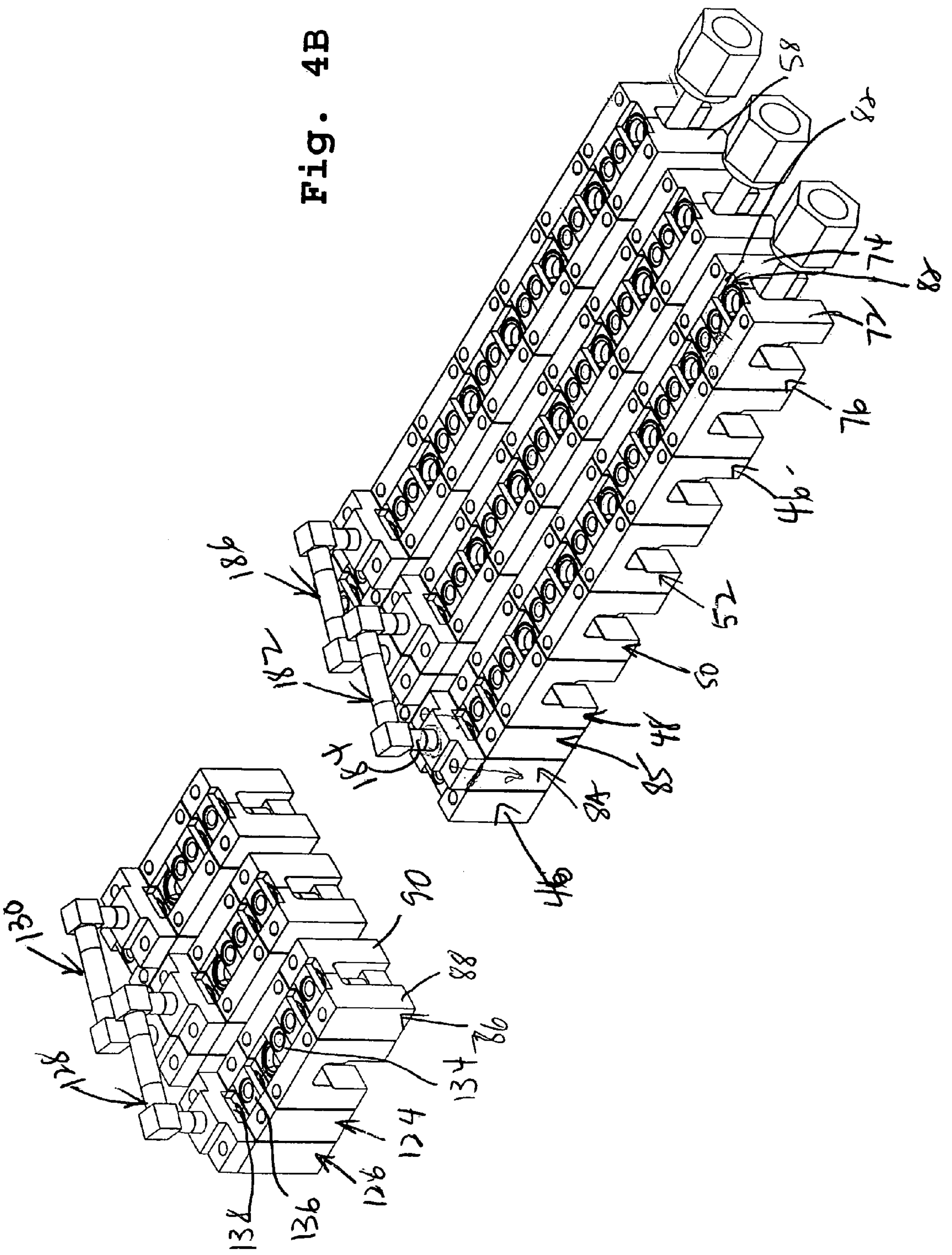
Figure 4C:
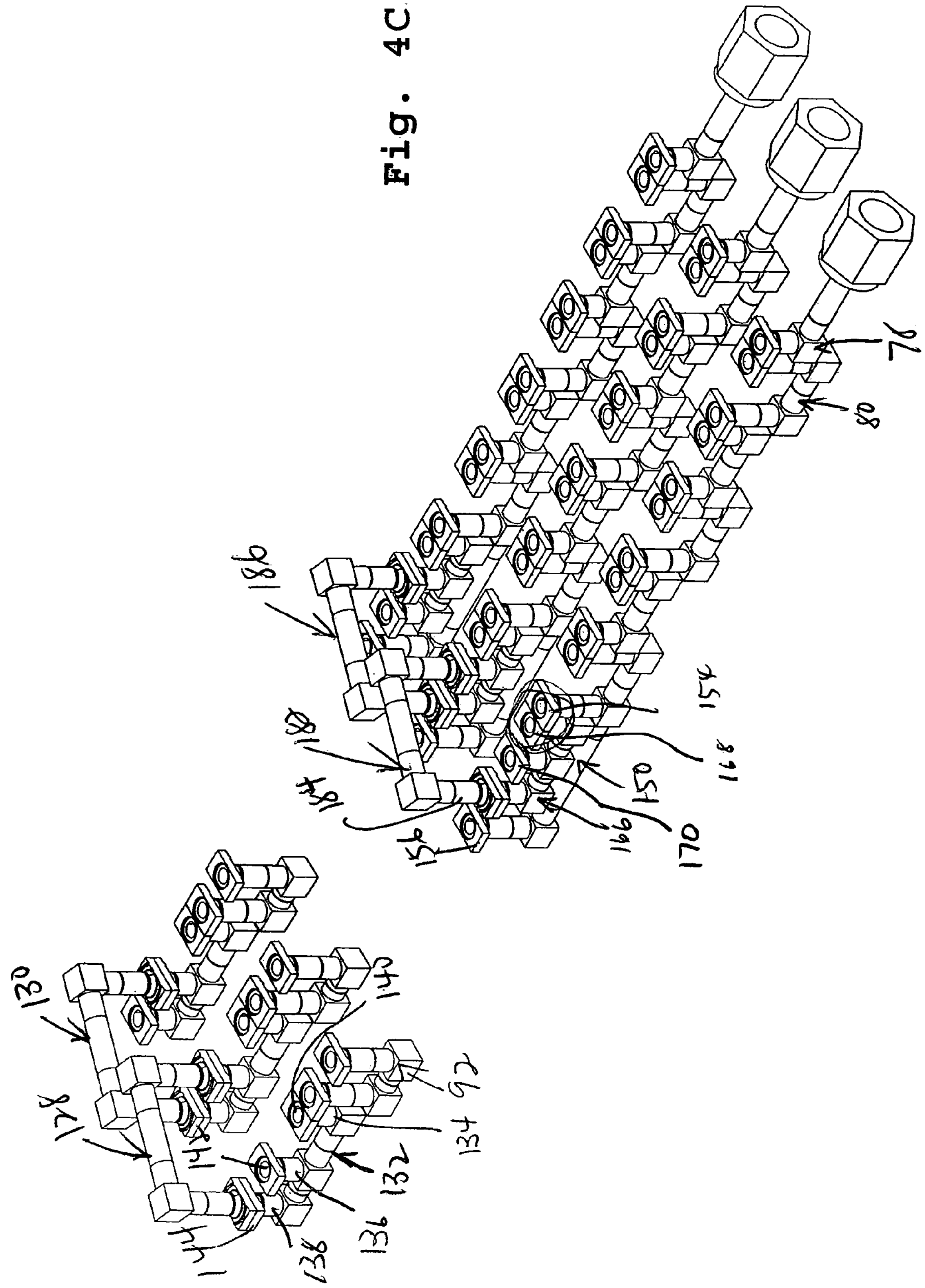

As noted above, and with reference to FIG. 1B and also to FIGS. 4A and 4B, the pipe modules are supported in the manifold by modular blocks, such as blocks 48, 50, 52. Each block, in turn, is formed by a pair of block modules, such as modules 72, 74 seen in FIG. 4B forming the upstream multiple-port block 76 in manifold 48, and modules 88, 90 forming a single-port block 86 in the same manifold. Although FIGS. 4B and 4C illustrate the manifold components for the modified assembly, the following description of the block modules apply to both unmodified and modified assemblies. Briefly, the two block modules making up a block each provides one or more semi-circular grooves, such that when two block modules are placed together, confronting grooves in the two modules form one or more openings in each of which a connector in a pipe module can be received. The block modules making up block 76 in the figure define three such openings, two of which are occupied by one of the connectors in each of two different pipe modules 78, 80 seen in FIG. 4C. The block modules making up block 86 in the figure define a single opening which is occupied by one of the connectors in pipe modules 92 seen in FIG. 4C.

With continued reference to FIG. 4B, the block modules are recessed at their upper surfaces such that when the two units are placed together, they form a rectangular groove or recess, such as recess 82 in block 76, for supporting one or more pipe module collars, to support the end of the pipe module in the modular block. That is, the confronting grooves in the block units form an opening through which the distal pipe section of a pipe module is received, with the collar or flange of the pipe support supported within and on the recess formed by the two grooves. The surface of the recess on which a pipe-module collar is supported is also referred to herein as a support region.

As detailed in the above-cited U.S. patent application, block-module support surfaces, when placed together, and the collar of a pipe module having a connector received in the opening formed by the two modules, have interlocking geometries that act to hold the two block modules together when force is applied on the collar against the support surface, when a fluid component is attached to and sealed against the upper surface of the collar. In the embodiment illustrated, the interlocking geometries take the form of an arcuate tongue-in-groove geometry, where tongue-in-groove refers to a pair of arcuate, e.g., semi-circular, tongues formed on opposite sides of a pipe-module collar, and complementary arcuate grooves formed on in each block-module unit support surface. As can be appreciated, when a collar is placed against a support surface, its two arcuate tongues are received in the associated grooves in opposite, confronting block modules. Thus, a force applied to the collar acts to lock the surface regions of the two block modules together, rather than acting to spread the modules apart. It will be appreciated that the locking structure may take a variety of forms, only requiring that the two confronting surfaces of the collar of block-module support surface have complementary interlocking surface features.

The block modules are preferably formed of an inexpensive and/or lightweight material. Such materials include different grades of stainless steel, different grades of aluminum, ceramic, sintered metals, stamped metals, and forged metals. In a preferred embodiment, the block modules are formed of stainless steel or aluminum. It will be appreciated that the recesses in the support surfaces may be dimensioned such that the flange or collar rests flush with the upper surface of the block module. Alternatively, the recess may be dimensioned such that the flange is recessed from the block module upper surface, not shown. In this embodiment, the flange may be recessed sufficiently to partially or wholly receive a seal, such as an o-ring, metal washer, C seal, W seal, or any other seal known in the art.

Once the individual manifolds in the assembled, the gas components are attached to the individual blocks, and the blocks themselves are secured to the assembly support by bolts, such as bolts 83 extending through openings formed at the bases of the gas components an in each of the block modules, as can be appreciated from FIG. 1A.

FIG. 2 shows in cross-sectional view, a portion of the pipe-module configuration seen in FIG. 1D that supplies the three-port purge gas valve 40 in each stick of the assembly. As will be appreciated from FIGS. 1B-1D, valve 40 is mounted on a block 48 (FIG. 1B), which provides three ports 54, 56, 58 to which the valve is connected. Port 54 is formed by the upstream connector of pipe module 60 (FIG. 1D), and places the valve in communication with the mass flow controller 42 through a port 92. Port 58 is formed by the downstream connector in pipe module 62, and places the valve in communication with two-port valve 38 in each stick. The middle port 56 is formed by a separate internal (below-surface) in-line pipe module 96 which consists of a horizontally extending section 98 which spans across the three sticks in the assembly, in a direction perpendicular to each manifold, and three connectors, such as connector 100 which extends between section 98 and a collar, such as collar 102 (FIG. 1D), supported in the associated manifold block, forming the central port for a three-port valve in each manifold. The valve's internal switch is shown at 57. Pipe-module section 98 is supplied with a purge gas through one end of pipe-module section 98.

During normal operation of the assembly, the purge-gas valve in each stick is in an "off" condition and the valve merely serves as a passive flow pathway between adjacent upstream and downstream gas components. During a gas purge operation, the valve in each stick is turned "on," and purge gas is supplied from pipe section 98 where it flows laterally to feed the purge valve in each stick, and from each purge valve, flows in both upstream and downstream directions within a stick, e.g., from port 56 through port 54 in a downstream direction and through port 58 is an upstream direction in stick 22, to force purge gas through all of the gas components and pipe connections in the assembly.

Completing the description of pertinent components in the basic, unmodified assembly, and with reference to FIG. 1C, the three sticks in the assembly are connected at their downstream end by an internal, in-line pipe module 104. This module is substantially like in-line pipe module 96 that connects the purge-gas valves in each of the three sticks, providing three connectors, such as connector 106, in fluid communication with a pipe segment 108 which carries gases from the three manifolds to a work station.

IIA1. Modifications with External Pipe Modules

The block and pipe modular construction of the assembly just described permits easy replacement and/or addition or removal of gas components within individual sticks, and removal of pipe modules within a stick for cleaning or replacement or reconfiguring. However, modifying pipe connections between adjacent sticks, e.g., to add or reconfigure the number of sticks in an assembly, requires removal of several panel components in each stick in order to access the internal pipe connections. For example, to add a new stick to the assembly described above, one would have to dismantle all of the gas components and block modules overlying in-line pipe module 96 supplying purge gas to the three sticks, and all of the gas components and the block modules overlying the in-line pipe module 104. The present invention allows sticks to be added or removed from the assembly, or the pipe modules connecting adjacent sticks to be replaced and/or reconfigured with very little disturbance of the modular components already in place. As will be discussed in the next subsection, the modification also allows simplification of the purge-gas valving in the assembly.

This section will consider a modification of the assembly to replace an internal (below-surface), in-line pipe module, such as module 104, connecting adjacent sticks in the assembly with an external (above-surface) pipe-module configuration. The modification that will be considered initially is one in which an internal in-line pipe module connecting adjacent sticks is replaced by an in-line external (above-surface) pipe module. This modification can be appreciated by comparing the pipe-module configuration shown for the downstream end of is manifold 48 in FIGS. 1B and 1C with that in FIGS. 3B and 3C, respectively. For ease of explanation, structures that are common to the basic assembly of FIGS. 1A-1D and the modified assemblies shown in corresponding FIGS. 3A-3D, (and also FIGS. 4A-4D) respectively, are given the same reference numbers in all three sets of drawings. Where the reference numerals refer to modified structure or structures, the same reference numeral will be used, it being understood that the structure referred to has been modified. Thus reference numeral 20 in FIGS. 3A or 4A refers to the same assembly, but having certain modifications. New components that are specific to the individual modification are assigned new reference numerals.

The modifications to each manifold will be described with respect to components in manifold 48, it being understood that similar modifications are made to the other manifolds in the assembly. It is also noted that the "modifications" described herein are not necessarily modifications to a preexisting assembly, but are more likely to involve modifications that are incorporated into an assembly when it is first constructed.

As noted above, and as seen in FIG. 1C, in-line pipe module 104 in assembly 20 provides an internal connection for the output of the two-port valve 44 in each stick, and combines the output of the three sticks in a common outlet 108. In the current modification, the assembly is modified by the addition, in each manifold, of a single-port modular block 112 placed just downstream of the block in assembly 20 that supports valve 44 in each manifold. Modular block 112 is formed as described above, by two confronting block modules, which when placed together, form a modular block with a single opening and an upper-surface recess in which the connector of an internal pipe module can be received and supported.

The current modification also involves introducing an additional internal two-port pipe module 114 that connects the downstream port of valve 44 with a connector 115 (FIG. 3C) that will form the port for connection to an external in-line pipe module 116 (FIGS. 3B and 3C) that will bridge the three sticks in the assembly. This internal pipe connection has the construction described above for other internal pipe modules in the assembly. Thus, instead of valve 44 in each stick connecting gas from the mass flow controller (component 42 in FIG. 1A) directly to below-surface pipe module 104, the current modification involves an additional internal pipe module connecting the downstream port of the valve with the external pipe module 116, where the downstream port of the additional pipe module 114 is supported in additional block 112.

Figures 3A, 3B, 3C, 3D:
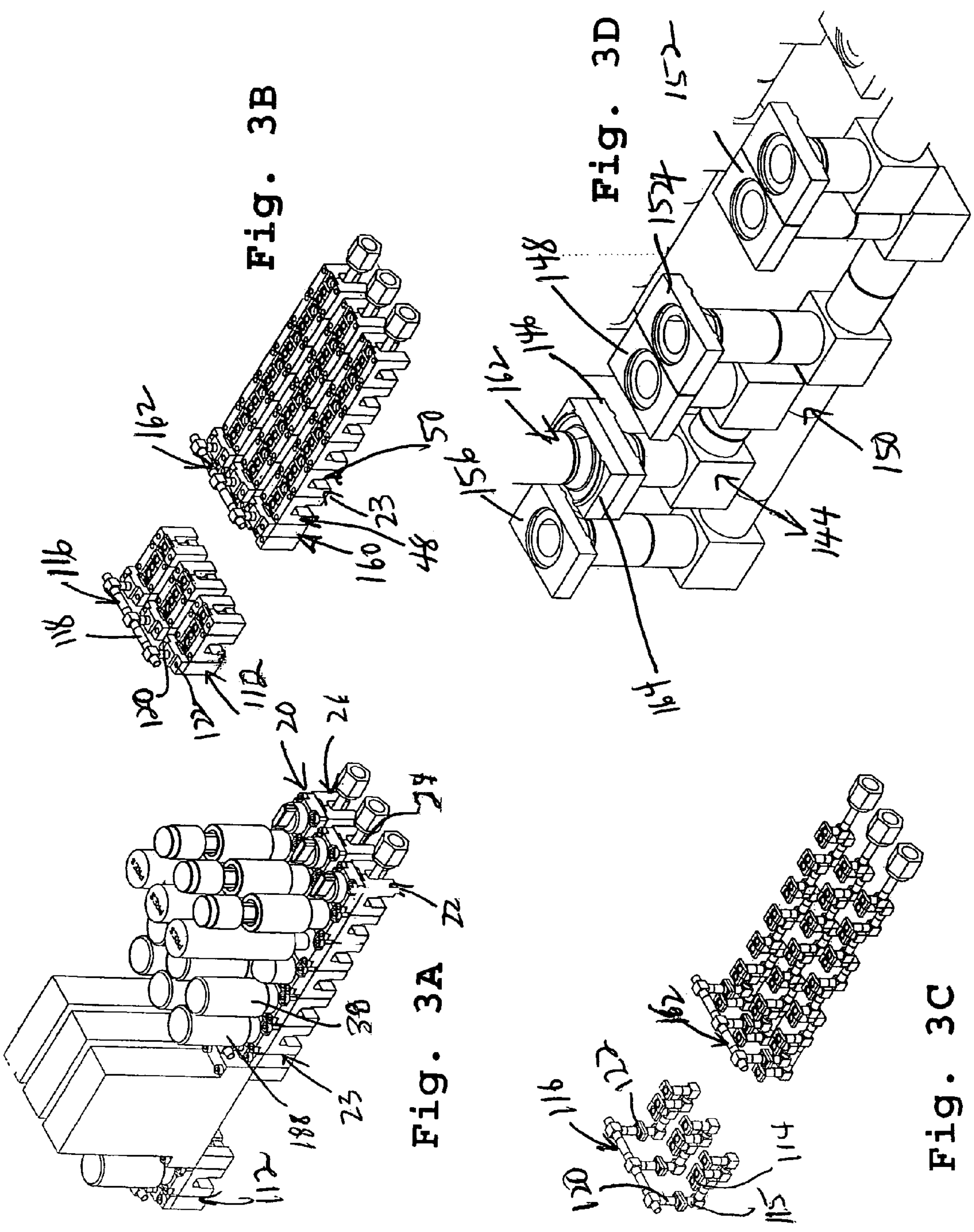
FIGS. 3A-3D are perspective views like those of FIGS. 1A-1D respectively, but illustrating a gas-component assembly modified according to the present invention to include single-module, in line external pipe connections and a two-port valve purge-gas configuration.

As seen in FIGS. 3B and 3C, in-line pipe module 116 includes a horizontally extended pipe section 118 and three connectors, such as connector 120, each terminating at a collar, such as collar 122, that will mate with the associated port in the newly added internal pipe module in each stick, to connect gas outflow from each stick to a common output pipe connection. As can be seen best in FIG. 3B, the additional block and pipe module in each stick, and the associated collar in pipe module 116 are secured to the assembly by bolts that extend through holes in the blocks and pipe-module collars as described above for assembly 20. With this modification, additional sticks can be added or removed without any disassembly of the existing sticks.

A similar type of modification may be made to replace the internal pipe module connecting the purge-gas valves 40 in the assembly. However, it is generally desirable, when connecting the purge gas valves with an external pipe module, to also reconfigure the internal pipe modules to provide a simplification of the purge-gas valving in a manner to be described below in Section IIA2.

In a related embodiment, the internal in-line pipe module connecting adjacent sticks is replaced by a plurality of external pipe modules, each connecting adjacent manifolds in an offset configuration in which at least one manifold is connected to adjacent manifolds by a pair of external pipe modules. This modification, which will again be discussed with reference to the downstream end pipe connection in assembly 20, is illustrated in FIGS. 4B and 4C. As seen here, the modification includes addition of two single-port modular blocks 124, 126 to the downstream end of each manifold in the assembly, or alternatively, addition of a single, two-port modular block. With continued reference to FIG. 4C, the modification further involves the addition of a new internal pipe module 132 to each manifold. Module 132 has three connectors 134, 136, and 138, the former providing a downstream port 140 for valve 44, and the latter two providing a port 142, 144, in each of the two blocks 124, 126 in manifold 48, as seen in FIG. 4B. Thus, valve 44 feeds both ports 142, 144 in each manifold 48.

To connect adjacent manifolds at their downstream ends, external pipe module 128 is connected across ports 144 in one manifold to offset port 142 in an adjacent manifold, and a second external pipe module 130 is similarly connected across the other pair of offset ports in adjacent manifolds. Thus each manifold is connected in a common pathway that includes both internal and external pipe modules. In the final configuration, one of the two unmatched ports of the external pipe modules is plugged and the other is connected to a single-connector external pipe module that serves to carry output gas from the three manifolds to the workstation where the gas is to be used.

As above, a similar configuration of separable external pipe modules can be used to connect purge-gas valves 40 in the assembly. However, as described in the section below, this modification will also preferably involve a modified internal pipe module configuration that leads to a simplified purge-gas valving.

IIA2. Modifications with External Pipe Modules and Simplified Purge-Gas Valving

This section describes modifications of the purge-gas configuration in assembly to replace the internal transverse pipe module connecting the multiple, e.g., three manifolds to a purge gas source with a single or multiple external pipe modules, and to replace certain internal pipe to allow for purging by a two-port gas valve rather than the three-port valve 40 used in assembly 20.

The pipe-module configuration for this modification, where the external pipe module is a single in-line module, is illustrated in FIG. 3D. In the unmodified assembly, as shown in FIG. 1D, the upstream and downstream ports 58, 54, respectively, of the three-port valve are each connected through a two-port pipe module to the adjacent gas component, with the purge-gas being supplied through an in-line module 96 connecting each central port of the three-port valve to a purge-gas supply. In the modified assembly, seen in FIG. 3D, these same internal connections are made by a two-port internal pipe module 144 which provides ports at connectors 146, 148, and a three-port internal pipe module 150 which provides ports at connectors 152, 154, 156. Connectors 154, 148 are mounted in modular block 48 that carries a two-port purge valve 188 (seen in FIG. 3A). Connector 154 is mounted in upstream block 50 on which upstream gas component 38 is mounted. Connector 146 is mounted in an additional single-port modular block 160 (FIG. 3B) that has been added to each manifold, and connector 156 is mounted in the single-port block 46 in the original assembly. The port provided by connector 146 in each manifold is connected by an in-line external pipe module 162, to supply purge gas to each of the internal pipe modules 144. The operation of the two-port purge-gas valve in this configuration will be appreciated from the discussion below with respect to FIG. 5.

FIGS. 4B and 4C describe a similar modification of the purge-gas connections in the assembly, but where the external pipe connection is provided by a plurality of offset, two-port external pipe modules as described above with respect to FIGS. 4B and 4C. The internal pipe module replacements are the same for the in-line modification just described, except that a three-port internal pipe module 166, providing connectors 168, 170 and 172 is used instead of two-port pipe module 144 in FIG. 3D. The downstream connectors 170, 172 of this pipe module are received in newly added blocks 84, 85, respectively, forming ports therein that will provide the port connections to external, two-port pipe modules 182, 186 in the offset configuration seen in FIG. 4B. The sealed connection, such as between connector 184 in module 182 and the port formed by the connector 172 in pipe module 166 is accomplished by bolting the pipe-module collar to the associated block, as described above. In the final configuration, one of the two unmatched ports is plugged and the other is connected to a single-connector external pipe module that serves to transport purge gas into the assembly.

Figure 5:
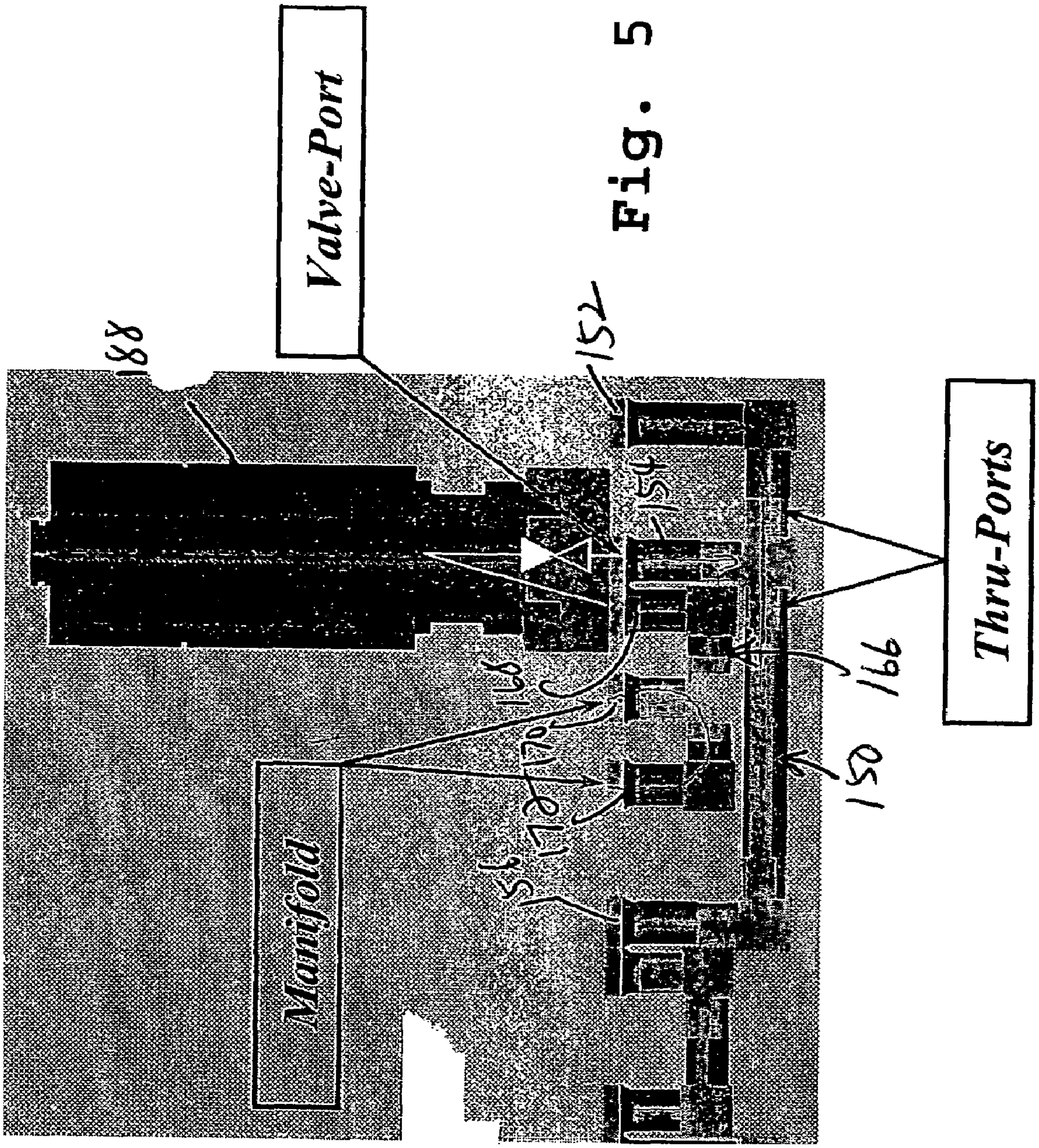
FIG. 5 shows in cross-section, the two-port purge-gas valve configuration in the modified assembly of FIGS. 4A-4D.

Finally, the three-port purge-gas valve 40 in the original assembly is replaced by a two-port valve 188 whose internal operation and connection to pipe modules 150, 166 is shown in FIG. 5. Under normal operating conditions, valve 188 in each stick is closed, and gas flow through each manifold bypasses pipe module 166. When it is desired to run a purge gas through the assembly, the valve is opened, and purge gas is supplied to port 170 in pipe module 166. With the valve open in each stick, purge gas is carried by the external pipe modules to each of internal pipe modules 166 in each stick, and from these modules, through the associated valve 188 into each pipe module 150 in each stick, and from there is forced in both upstream and downstream directions through the entire stick.

It will be appreciated how the above modifications to the purge-gas components in the assembly both simplify the purge-gas valving in the system, and allow expansion or contraction of the total number of sticks in the assembly without having to dismantle any existing components of the assembly. Further, where the pipe connections between and among manifolds is by the two-port offset pipe modules, any expansion or contraction can be accomplished with the existing two-port pipe modules.

IIB. Modular Units with Internal Fluid-Flow Passageways

Figure 6:
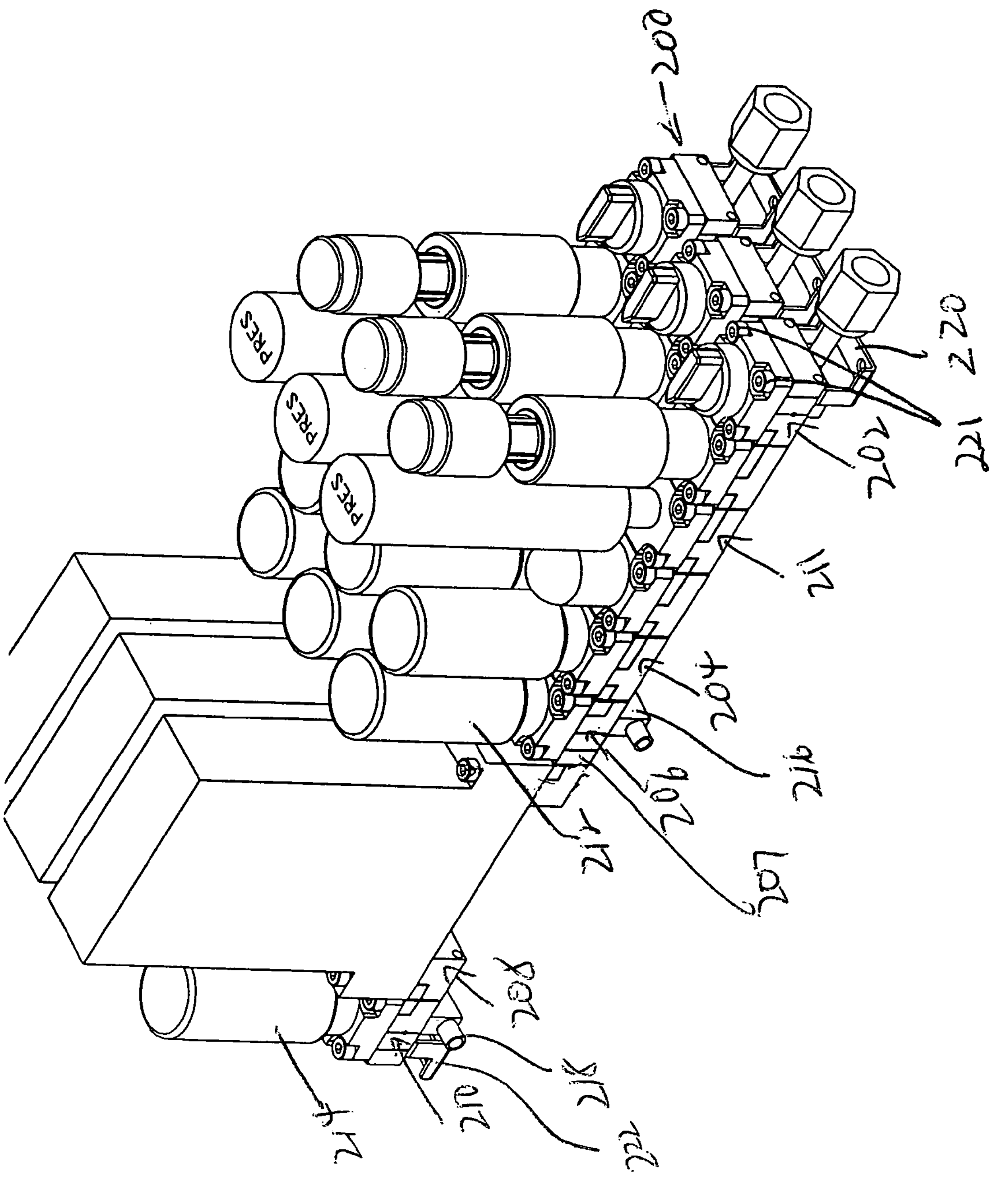
FIG. 6 is a perspective view illustrating another type of unmodified gas assembly with three sticks.

In another general embodiment, the gas-panel assembly that is modified in accordance with the invention is composed of modular blocks in which the gas passageways are formed within the modular blocks. That is, the modular blocks themselves define the structure of means for carrying gas among and between the gas components mounted on each manifold. FIG. 6 shows in perspective view, three sticks, such as stick 202, in an assembly 200 of this type. Stick 202, which is representative, is composed of a plurality of modular blocks, such as blocks 204, 206, 208, and 210, that form a manifold, such as manifold 211, with each gas component being supported on a block interface formed by the overlap of two blocks, as will be seen below with respect to a three-port gas-purge valve 212 and a downstream end two-port valve 214. The gas-purge valve is supplied purge gas from a below-surface pipe connector 216 that communicates with the valve in each stick, and the downstream valve in each stick communicates with a below-surface pipe connector 218 to carry mixed gas from the assembly to a work station. The three stick are carried on upstream and downstream frame members 220, 222, which mount the sticks on a suitable support, and elevate the sticks to accommodate pipe connectors 216 and 218.

Figures 7A, 7B, 7C:
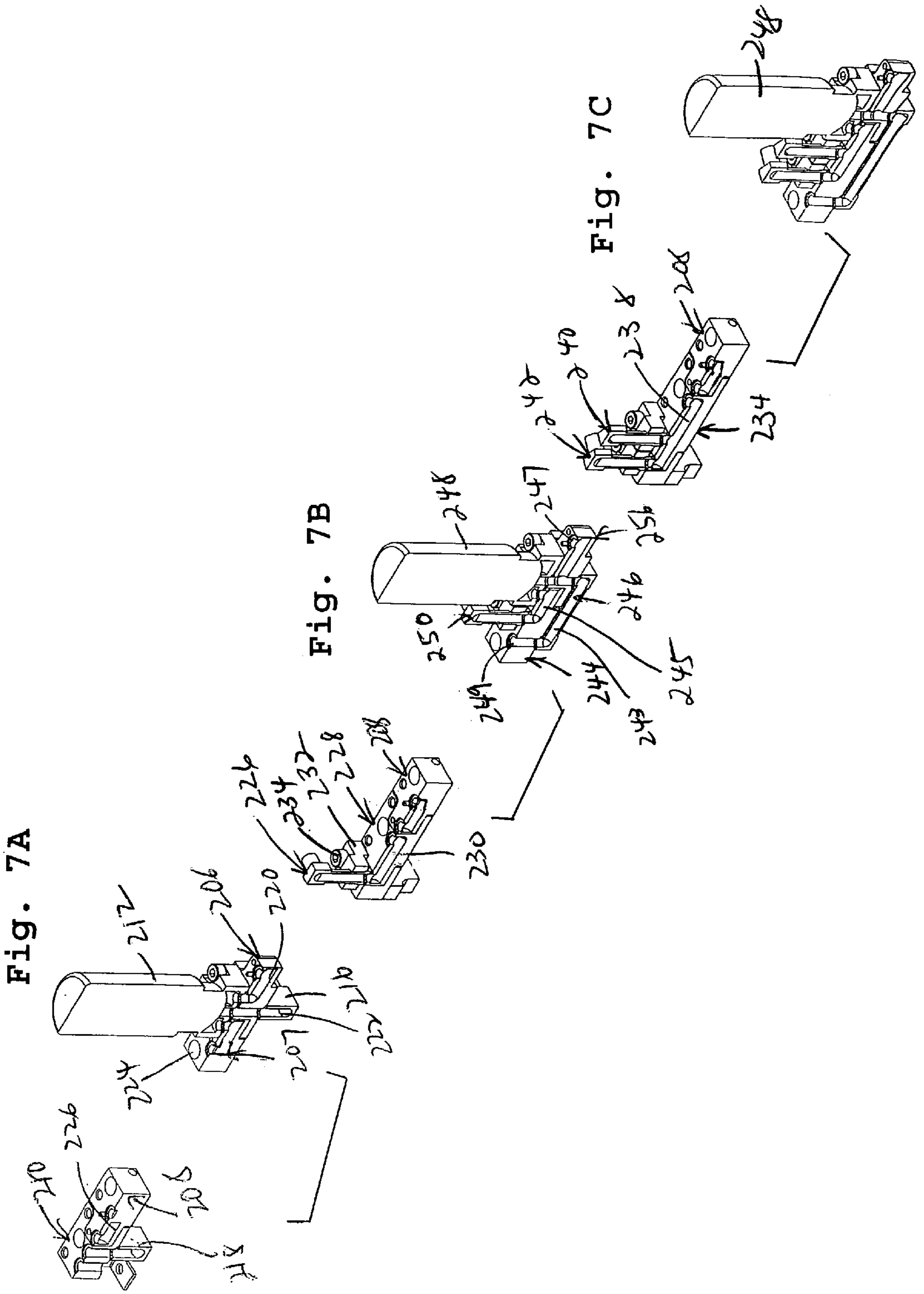
FIGS. 7A-7C are perspective, cutaway views of portions of a stick in the unmodified gas assembly of FIG. 6 (7A), a stick from a gas assembly modified according to an embodiment to include single-module in line external pipe connections and a two-port valve purge-gas configuration (7B), and a stick a gas assembly modified according to another embodiment of the invention to include two-port, offset external pipe connections and a two-port valve purge-gas configuration (7C)
Figures 8A, 8B, 8C:
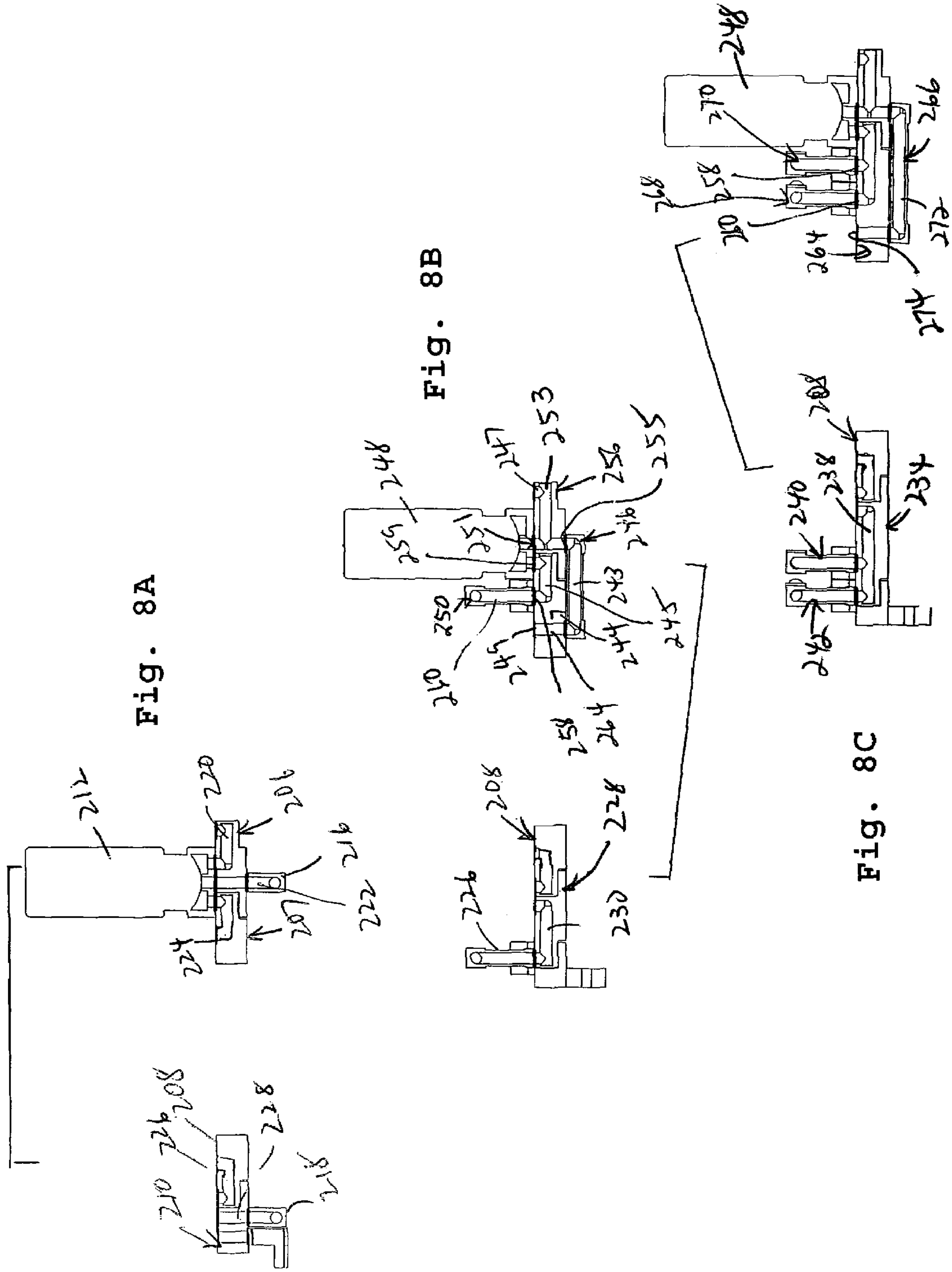
FIGS. 8A-8C are sectional views of the portions of the prior art and modified sticks shown in FIGS. 7A-7C, respectively.

FIG. 7A shows, in perspective cutaway view, portions of stick 202 in the unmodified assembly 200 in the manifold regions of a purge-gas valve 212 and the downstream two-port valve 214, and these same regions are shown in side sectional view in FIG. 8A. As seen in these figures, three-port valve 212 is mounted on blocks 206, 207, with the upstream port in valve 212 in communication with a conduit 220 that connects valve 212 with the immediately upstream gas component. The central port of valve 212 is supplied from connector 216 through a conduit 222 and the third port in the valve is connected through a conduit 224 in block 207, with valve 212 being mounted at a region straddling the intersection of blocks 206, 207.

With continued reference to FIGS. 7A and 8A, downstream, two-port valve 214 (FIG. 6) is mounted on blocks 208, 210 at their region of interface, with one valve port being in communication with a conduit 226 formed in block 208 and the second valve port being in communication with connector 218 through a conduit 228 formed in block 210. The gas components are attached to the blocks by bolts, such as bolts 221, which engage threaded openings in the blocks.

IIB1. Modification of Downstream End Pipe Connections

This section will describe the modifications of assembly 200 to include either an in-line external pipe module or a plurality of offset external pipe modules at the assembly's downstream end, for carrying gas from the assembly to its intended workpiece destination. FIGS. 7B and 8B illustrate the modification in which below-surface connector 218 in the assembly is replaced with a single external, inline pipe module 226 similar to pipe module 116 described above. The modification involves replacing block 210 with a new downstream block 228 having an internal conduit 230 communicating the downstream port of valve 214 with pipe module 226. The external pipe module is secured to the upper surface of block 228 by bolts, such as bolt 234 which extend through the pipe-module collar 232 and into the threaded openings in block 228.

A modification of the downstream pipe connection to provide for pairs of offset pipe modules is illustrated in FIGS. 7C and 8C. This modification differs from the one just described in that the downstream-end block 234 has an internal conduit 238 that communicates the downstream port of valve 214 with a pair of two-port pipe modules 240, 242, like pipe modules 128, 130 described above. The individual sticks are then connected to these ports by pairs of offset, two-port external pipe modules, such as pipe modules 240, 242, whose construction is identical to those two-port external pipe modules described above.

IIB2. Modifications with External Pipe Modules and Simplified Purge-Gas Valving

A first gas-purge valve embodiment to be described is the one shown in FIGS. 7B and 8B in which a two-port purge-gas valve 248 replaces the original three-port valve 212, an external inline pipe module 250 is used to connect the supply of purge gas to each of valves 248, and lower blocks 206, 207 in the original assembly are replaced by blocks 256, 244, and 246. As seen best in FIG. 8B, new block 256 provides an internal T-shaped conduit 253 that connects a block port 247 with an upper valve port 251 and a lower port 255. New block 244 provides an internal conduit 245 that communicates a second valve port 259 with the conduit 260 in pipe module 250. Lower block 246 provides a conduit 243 connecting port 255 with a second conduit 264 in block 244. Block 246 is attached, as by bolting, to the under surfaces of blocks 256, 244.

Two-port gas valve 248 is attached to the interface of blocks 256, 244, bridging ports 251, 259. An upstream gas component is attached to the manifold so as to communicate with port 247, and a downstream gas component is attached to the manifold so as to communicate with port 249. Finally, external pipe module 250 is attached to the remaining port 258 in block 244, connecting the gas-purge line with each of the gas purge valves 248 in the assembly.

The operation of the two-port purge-gas valve, in combination with the external purge-gas pipe module can be appreciated from the description above with respect to FIG. 5. Under normal operating conditions, valve 248 in each stick is closed, and gas flow through each manifold is through conduit 243 in block 246, bypassing conduit 245 and valve 248. When it is desired to run a purge gas through the assembly, the valve is opened, and purge gas is supplied to pipe module 250, being carried by the external pipe module to conduit 245 in each of blocks 244, and from this block through the associated valve 248 into upstream and downstream conduits 253, 243, respectively, from which the purge gas is forced in both upstream and downstream directions through the entire stick.

FIGS. 7C and 8C illustrate a similar modification to the purge-gas valve configuration, but where the external pipe-module connections between the purge-gas valves is through a plurality of two-port modules arranged in a side-by-side configuration as described with respect FIGS. 4A-4D. This configuration is identical to the one just described, except that instead of blocks 244, 246 in the previous embodiment, new blocks 264, 266, respectively are used, and instead of a single in-line external pipe module 250, pairs of two-port external pipe modules, such as modules 268, 270 are mounted on the manifolds in the offset fashion seen in FIG. 4B.

Block 264 is identical to block 244, except that it provides a pair of ports 258, 260 on the blocks upper surface, for communicating the input to the purge valve to each of two two-port external pipe modules 268, 270. Block 266 differs from block 246 in providing an extended internal conduit 272 to span the longer distance between valve 248 and port 274 at the downstream end of block 264. Pipe modules 268, 270 are identical to those described above with respect to FIGS. 4A-4D.

The valve operation is as described for the in-line external pipe module, except that purge gas flow to the valve occurs through the pairs of offset external pipe modules, essentially as described above with reference to FIG. 5. Like the purge-gas configuration described with reference to FIGS. 4 and 5, the present one provides the additional advantage over the in-line configuration in that sticks can be added to or removed from the assembly without having to replace or modify any of the existing external pipe modules.

III. Modifications with Enlarged Pipe Connections

As noted above, and as seen, for example, by comparing FIG. 5 with FIG. 2, the above-surface pipe connection in the present invention allows for the use of two-port gas-component valves to control internal flushing and regulate the flow of output gas in each assembly stick. As will now be seen, the substitution of a two-port valve for each of the three-port valves in an assembly allows for the larger-diameter pipe connections between and among the gas components in an assembly for any given scale of assembly components.

For example, one standard gas-component size in commercial gas panel assemblies, measured by the base dimension of the gas-components (and therefore, the dimensions of the manifold assembly stations at which the gas components are mounted) is 1 and ⅛ inch on a side (in a square block). In order to support a three-port valve of this size, each pipe feeding the valve is limited to a pipe diameter of about ¼ inch, that is, the cross-sectional diameter of the interior of the pipe connection is ¼ inch, and more generally to between about 0.18 to 0.3 inches. This same size block can accommodate two pipe connections, for a two-port valve, having pipe diameters of about ⅜ inch and more generally, between about 0.305 to 0.375 inches. Thus, the cross-sectional area or flux area of the enlarged pipe connections can be 100% or more of that of the conventional size pipe connections.

Figure 9A:
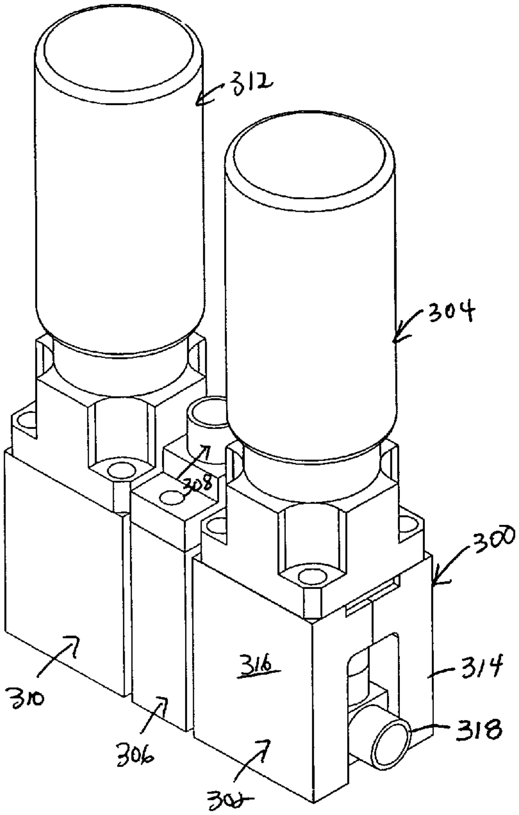
FIGS. 9A and 9B are perspective and cutaway views, respectively, of a portion of a stick showing a two-port valve, an overhead port and an adjacent gas component in an embodiment of the invention having enlarged fluid connections.
Figure 9B:
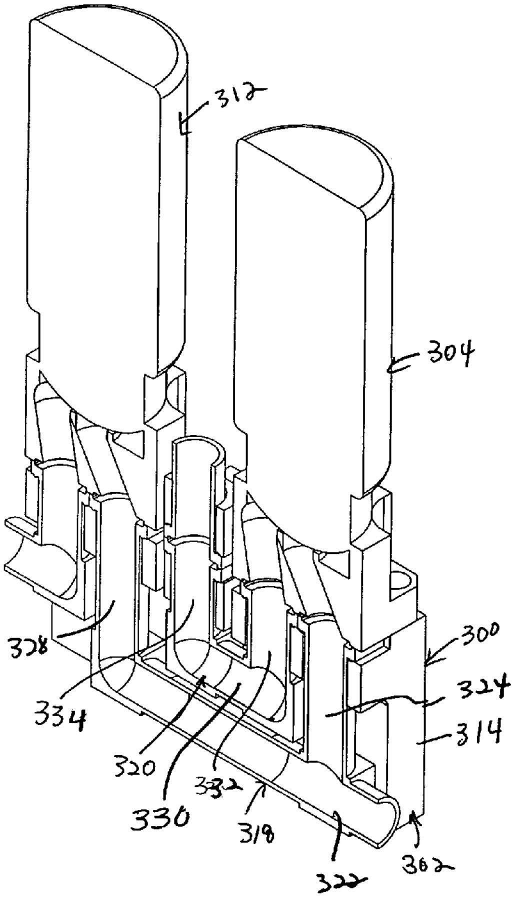

FIGS. 9A and 9B show a portion of a stick 300 in a gas-panel assembly of the type described above. In particular, the figures show, in an upstream-to-downstream direction, a two-port modular block 302 supporting a two-port valve 304, a single-port modular block 306 to which an external pipe module 308 is connected, and a two-port modular block 310 supporting a two-port gas component 312. As detailed above, each modular block, such as block 302, is composed of a pair of confronting block modules, such as modules 314, 316 in block 302, which support opposite ends of two pipe modules, such as pipe modules 318, 320 seen in FIGS. 9B and 9C. The block modules differ from the ones described above in having larger-diameter support structure for supporting the large-diameter pipe connections in the supported pipe modules.

Figure 9C:
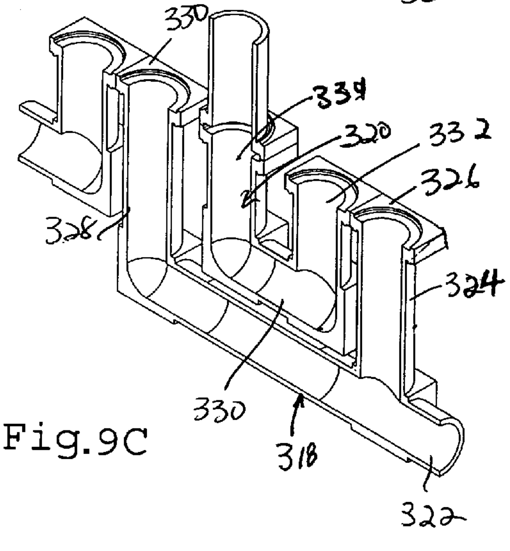
FIG. 9C shows the pipe modules seen in cross-section in FIG. 9B.

As can be seen best in FIGS. 9B and 9C, pipe module 318 includes a horizontally extending pipe section 322 and a pair of pipe connectors 324, 328, communicating the upstream port of valve 304 with the upstream port of gas component 312, where the pipe connectors are supported in their respective modular blocks by collars, such as collars 326, 330, respectively.

Figure 4D:
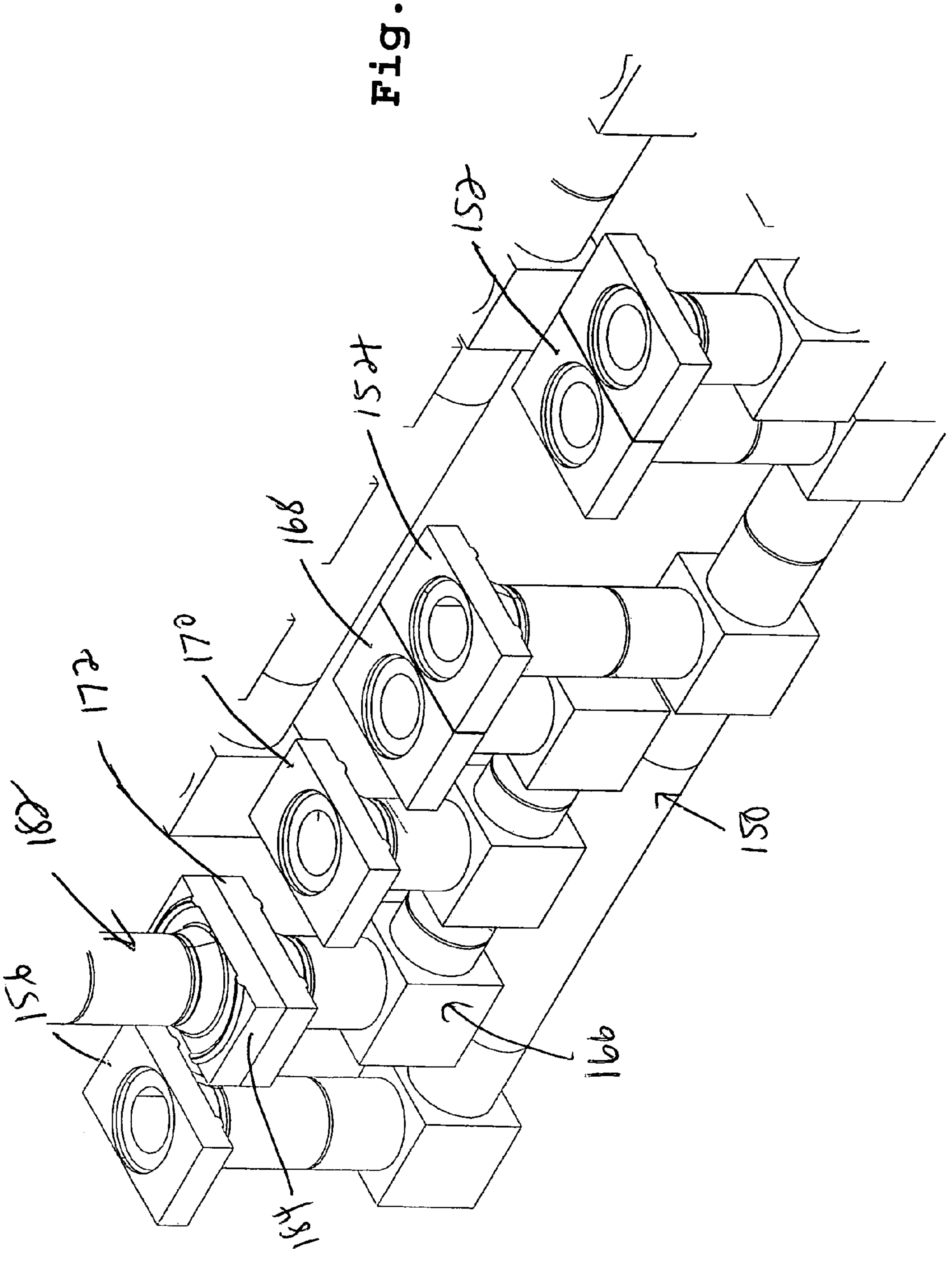

Although not seen in the figures, pipe module 318 has a third pipe connector which is supported in a modular block (not seen) just upstream of block 302, similar to pipe module 150 seen in FIG. 4D and 5. Thus, pipe module 318 (like pipe module 150) provides a fluid connection across the two-port valve, when the valve is closed, and a connection from the two-port valve to gas components in both upstream and downstream directions, when the valve is open, as described above with respect to FIG. 5. Pipe module 318 differs from above-described pipe module 150 in having enlarged-diameter pipe connectors and collars.

With continuing reference to FIGS. 9B and 9C, pipe module 320 includes a horizontal pipe section 330 connecting end pipe connectors 332, 334. As seen in FIG. 9B, this pipe module connects the downstream port of two-port valve 304 mounted on block 302 to the single port of modular block 306, and thus, to the external pipe connection 308 in the system. When fluid is supplied to the external pipe connection form a gas source, and valve 304 is opened, gas flows through the valve and into pipe module 318 where it is forced both upstream and downstream through all of the components of the corresponding gas-panel stick. As with pipe module 318, module 320 differs from the corresponding two-connector modules above in having enlarged-diameter pipe connectors and collars.

Although not shown here, the modification of a gas-panel assembly stick in accordance with this embodiment will typically include: replacing each of pipe modules with the enlarged-diameter modules, each of the modular blocks with blocks of the type shown in FIGS. 9, adapted for receiving and supporting the modified pipe modules, and a similar three-port to two-port valve substitution at the downstream most end of the stick, as described in the sections above. In addition, rather than a one-port modular block for supporting a single external pipe connection adjacent each two-port valve, the assembly may be modified to have a pair of side-by-side single port blocks or a single two-port block for accommodating a pair of external pipe connections, one connecting to a gas source, and the other feeding gas to an adjacent stick in the gas assembly, as described above.

Finally, it will be appreciated that the enlarged-pipe modification can be applied as well to a modular or semi-modular assembly in which the pipe connections are formed as bores within solid manifold blocks, rather than as independently supported pipe modules.

From the foregoing, it will be appreciated how various objects and features of the invention are met. The overhead, external pipe connections between valves in the stick assembly allows sticks to be added, removed, or modified without having to dismantle any of the components of the manifold itself. In the case where the manifolds are connected by pairs of offset external pipe modules, the sticks may reconfigured easily without having to replace or modify the existing external pipe modules. The modified purge-gas configuration allows gas purging of the assembly with a simpler two-port valve. Finally, the two-port valve configuration allows the diameter of the fluid connections in the system to be enlarged to more than double the carrier capacity of the pipe connections relative to a system requiring three-port valving, within the space constraints of fixed gas-component dimensions.

The foregoing description of the embodiments of the present invention has been provided for the purposes of illustration and description. It is not intended to be exhaustive or to limit the invention to the precise embodiments disclosed. Obviously, many modifications and variations will be apparent to those skilled in this art. It is intended that the scope of the invention be defined by the following claims and their equivalents.

It is claimed:

1. A gas-panel manifold for use in a gas-panel assembly mounted on a support, comprising (i) a plurality of two-port stations at which gas components, including one or more gas-valve components, can be mounted, (II) at least one station having a port for accommodating an overhead fluid connection, and (iii) internal fluid connections between individual stations in the manifold, for carrying a gas from one gas component mounted on the assembly to another, and for carrying gas from said one station to one of the two ports at a station which a valved gas component is to be mounted, where said fluid connections have a cross-sectional area that is larger than can be accommodated by a three-port station of the type used for mounting a three-port valved gas component.

2. The manifold of claim 1, wherein the cross-sectional area of the fluid connections is at least about twice that of a fluid connection that can be accommodated by such a three-port connections.

3. The manifold of claim 2, wherein said component stations are dimensioned to accommodate gas components with 1 and ⅛ inch block size, and said fluid connections have internal diameters between 0.305 to 0.375 inches.

4. The manifold of claim 1, wherein said one manifold station of element (II) has two ports, each for accommodating an overhead fluid connection to that station.

5. The manifold of claim 1, which is composed of a plurality of side-by-side modular blocks, and said internal fluid connections are formed by a plurality of pipe modules supported by said blocks.

6. The manifold of claim 5, wherein each block module is composed of a pair of confronting block modules, where each block module provides:

(i) at least one groove formed therein, such that when two block modules are placed together, confronting grooves in the two modules form an opening in which a portion of an internal pipe module can be received, (II) an upper surface region adjacent each groove, such when two block modules are placed together, confronting surface regions define a support region for supporting a collar of a pipe module having a connector received in said opening.

7. The manifold of 6, wherein said pipe modules, but not said block modules, are formed of a corrosion-resistant material.

8. The manifold claim 7, wherein said pipe modules are formed of a material selected from the group consisting of 304 stainless steel, 316L VIM-VAR, Hastelloy™, aluminum, and ceramic, and said block modules are formed of a material selected from the group consisting of stainless steel and aluminum.

9. In a gas-panel assembly comprising a manifold having a plurality of gas-component stations at which gas components can be mounted, including stations having both two ports and three ports, and internal fluid connections between the individual ports in said stations, an improvement comprising (i) the replacement of each three-port manifold station by a two-port station, (II) the addition of an external-connection manifold station adjacent each manifold station at which a three-port station is replaced by a two-port station, said external-connection station providing an internal fluid connection between an external gas tube and one of the ports in the adjacent two-port station, and (iii) a modification of the fluid connections to increase their cross-sectional area or areas to a size allowed at a two-port station, but not a three-port station.

10. The improvement of claim 9, wherein said modification is effective to increase the cross-sectional area(s) of the fluid connections by more than 100%.

11. The improvement in claim 10, wherein said manifold has component stations that accommodate gas components with 1 and ⅛ inch block size, and the increase in the cross-sectional area of said fluid connections is from an internal diameter of between 0.18 to 0.25 inches, to between 0.305 to 0.375 inches.

12. The improvement of claim 9, wherein said separate manifold station includes a second internal connection for carrying fluid from an external gas tube to another assembly.

13. The improvement of claim 9, wherein said unmodified manifold is composed of a plurality of side-by-side modular blocks, said internal fluid connections are formed by a plurality of pipe modules supported by said blocks, the external-connection manifold station is provided by a separate modular block.

14. The improvement of claim 13, each block module is composed of a pair of confronting block modules, where each block module provides:

(i) at least one groove formed therein, such that when two block modules are placed together, confronting grooves in the two modules form an opening in which a portion of an internal pipe module can be received, (II) an upper surface region adjacent each groove, such when two block modules are placed together, confronting surface regions define a support region for supporting a collar of a pipe module having a connector received in said opening.

15. The improvement of 14, wherein said pipe modules, but not said block modules, are formed of a corrosion-resistant material.

16. The improvement claim 15, wherein said pipe modules are formed of a material selected from the group consisting of 304 stainless steel, 316L VIM-VAR, Hastelloy™, aluminum, and ceramic, and said block modules are formed of a material selected from the group consisting of stainless steel and aluminum.

17. A method for increasing the gas-flow capacity in a gas-panel assembly composed of a manifold having a plurality of gas-component stations at which a plurality of gas components are mounted, including stations having both two ports and three ports, and internal fluid connections between the individual ports in said stations, said method comprising (i) replacing each three-port manifold station in the assembly to a two-port station, (II) adding an external-connection manifold station adjacent each manifold station at which a three-port station is replaced by a two-port station, where said external-connection station provides an internal fluid connection between an external gas tube and one of the ports in the adjacent two-port station, and (iii) modifying the fluid connections to increase their cross-sectional area or areas to a size allowed at a two-port station, but not a three-port station.

18. The method of claim 17, wherein said modifying in step (c) is effective to increase the cross-sectional area of the fluid connections by more than 100%.

19. The method of claim 18, wherein said manifold has component stations that accommodate gas components with 1 and ⅛ inch block size, and said modifying in step (c) is effective to increase in the cross-sectional area of said fluid connections from an internal diameter of between 0.18 to 0.25 inches, to between 0.305 to 0.375 inches.

* * * * *